United States Patent
Jones et al.

(10) Patent No.: US 7,392,820 B2
(45) Date of Patent: Jul. 1, 2008

(54) LIQUID SHUT-OFF VALVE

(75) Inventors: William E. M. Jones, #A6 Waters Edge, Ocean Hill Boulevard, Freeport (BS); Trevor Alden, Huntingdon Valley, PA (US)

(73) Assignee: William E. M. Jones, Freeport (BS)

( * ) Notice: Subject to any disclaimer, the term of this patent is extended or adjusted under 35 U.S.C. 154(b) by 296 days.

(21) Appl. No.: 11/038,302

(22) Filed: Jan. 19, 2005

(65) Prior Publication Data

US 2005/0199285 A1 Sep. 15, 2005

Related U.S. Application Data

(60) Provisional application No. 60/537,692, filed on Jan. 20, 2004.

(51) Int. Cl.
*H01M 2/36* (2006.01)

(52) U.S. Cl. .................. 137/260; 137/409; 137/453; 141/198; 429/64

(58) Field of Classification Search .......... 137/260, 137/409, 410, 453, 454; 141/1.1, 32, 198, 141/213, 214; 429/63, 64, 74–78; 251/129.02
See application file for complete search history.

(56) References Cited

U.S. PATENT DOCUMENTS

| | | | | |
|---|---|---|---|---|
| 1,505,450 A | * | 8/1924 | Walker | 137/213 |
| 1,789,493 A | * | 1/1931 | Northrop | 137/445 |
| 1,942,908 A | * | 1/1934 | Swain et al. | 137/260 |
| 2,175,304 A | * | 10/1939 | Muller | 141/213 |
| 2,433,989 A | * | 1/1948 | Hansen | 137/454 |
| 2,564,305 A | * | 8/1951 | Hicks | 137/557 |
| 2,780,239 A | * | 2/1957 | Hjulian | 137/416 |
| 3,071,150 A | | 1/1963 | Whitlock | 137/391 |
| 3,872,899 A | * | 3/1975 | Knight | 141/59 |
| 4,556,093 A | | 12/1985 | Jones | 141/206 |
| 4,601,177 A | * | 7/1986 | Tanino et al. | 62/149 |
| 4,640,307 A | * | 2/1987 | Roberts | 137/448 |
| 4,696,874 A | * | 9/1987 | Tadiello | 429/64 |
| 4,749,633 A | * | 6/1988 | Elias | 429/64 |
| 4,751,156 A | * | 6/1988 | Olimpio | 429/64 |
| 5,002,100 A | * | 3/1991 | Frederick | 141/35 |
| 5,309,937 A | | 5/1994 | Rover | 137/260 |

(Continued)

FOREIGN PATENT DOCUMENTS

GB 963228 7/1964

*Primary Examiner*—John Rivell
*Assistant Examiner*—Craig Price
(74) *Attorney, Agent, or Firm*—Synnestvedt & Lechner LLP

(57) ABSTRACT

An automatic shut-off valve suitable for watering of batteries is disclosed. The valve is formed by a chamber having an inlet and an outlet. A seat surrounds the outlet. A spring biased piston within the cylinder is movable into and out of sealing engagement with the seat to open and close the valve. A flow deflecting surface is positioned between the inlet and the piston. Water flow is directed around the piston to eliminate drag that would force the piston into engagement with the seat. A second deflector surface directs flow against the piston to bias it open. An actuator cup, fed by a nozzle extending from the outlet, draws the piston into engagement with the seat when the cup is sealed by engagement with the electrolyte surface. The valve may also employ a float actuator connected to the piston.

17 Claims, 4 Drawing Sheets

U.S. PATENT DOCUMENTS

| | | | |
|---|---|---|---|
| 5,472,012 A * | 12/1995 | Wood et al. | 137/416 |
| 5,803,138 A | 9/1998 | Oschmann et al. | 141/198 |
| 5,814,213 A * | 9/1998 | Glasgow | 210/104 |
| 5,850,849 A * | 12/1998 | Wood | 137/446 |
| 5,862,830 A * | 1/1999 | Landau | 137/260 |
| 6,095,206 A | 8/2000 | Jones et al. | 141/198 |
| 6,148,852 A * | 11/2000 | Osterman | 137/391 |
| 6,179,020 B1 | 1/2001 | Hutchinson | 141/206 |
| 6,227,229 B1 | 5/2001 | Campau | 137/260 |
| 6,651,953 B2 * | 11/2003 | Weldon | 251/129.02 |
| 2002/0088958 A1* | 7/2002 | Weldon | 251/129.21 |

* cited by examiner

LIQUID SHUT-OFF VALVE

FIELD OF THE INVENTION

This invention relates to automatic shut-off valves for controlling liquid flow to batteries for aqueous electrolyte replenishment.

BACKGROUND OF THE INVENTION

Automatic watering systems for batteries employ independent valves in each cell of the battery to control the flow of water into the cells for replenishing the aqueous electrolyte that is lost during battery charging. Such batteries typically comprise a casing containing a number of individual cells, each holding an electrolyte solution in which plates are immersed. Examples of batteries having an aqueous electrolyte include nickel-cadmium batteries or lead-acid type batteries. Oxygen and hydrogen gases are produced during charging as a result of electrolysis of the water. The electrolysis causes a loss of water from the electrolyte solution, and, as a result, such batteries require periodic replenishment of the lost water.

It is advantageous for the valves to operate effectively across a wide range of water pressures. They should be sensitive enough to operate at low pressures of about 4 psi, but stable enough to operate at high pressures of about 50 psi.

Valves currently in use for battery watering may be classified in one of two categories, i.e., hydrostatic or hydrodynamic. Hydrostatic valves typically rely on a float buoyed by the electrolyte to open and close the valve, while hydrodynamic valves rely on a venturi-based mechanism for actuation. Both types of valves can employ a positive stop configuration. Positive stop valves have a closing member, typically a piston, that moves within a pressurized chamber through which the water or other fluid flows. Upon actuation by the float or venturi mechanism, the piston engages with or disengages from a seat within the chamber to close and open the valve. In the positive stop configuration, the piston moves into the closed position with the water flow or pressure. Positive stop valves, be they hydrostatic or hydrodynamic, suffer from the same disadvantage, in that hydrodynamic drag on the piston engendered as water flows through the valve can cause the piston to close the valve prematurely in response to the water flow or pressure, and not in response to the fluid level as intended. Positive stop valves in particular, tend to close prematurely when operated at high pressures which generate high drag forces on the piston and its actuating mechanism. This characteristic limits the range over which positive stop valves may be effectively employed to the lower pressures. There is clearly a need for a valve that can operate over a large pressure range, encompassing both high and low pressures and flow rates, without premature closing due to high hydrodynamic drag.

SUMMARY OF THE INVENTION

The invention concerns a valve for controlling fluid flow, and particularly positive stop valves operable over a wide range of pressures and flow rates useful for automatic battery watering. The valve according to the invention comprises a chamber having a fluid inlet and a fluid outlet. A valve seat surrounds the outlet. A valve closing member is positioned within the chamber. The closing member is movable between a closed configuration in sealing engagement with the seat, thereby stopping flow of the fluid through the outlet, and an open position in spaced relation away from the seat. A biasing member is engaged with the closing member. The biasing member biases the closing member into the open configuration. An actuator is engaged with the closing member. The actuator is adapted to apply a force moving the closing member into the closed configuration. A first deflector surface is positioned within the chamber between the inlet and the closing member. The first deflector surface deflects the flow of the fluid around the closing member to prevent flow of the fluid from engaging and moving the closing member into the closed configuration.

The valve according to the invention may also include a second deflector surface positioned within the chamber downstream of the valve closing member. The second deflector surface deflects the flow of the fluid against the closing member so as to further bias the closing member into the open configuration. Preferably the second deflector surface is positioned surrounding the seat in facing relation with the closing member.

In one hydrodynamic embodiment of the valve, the actuator comprises a cup having a first end positioned outside of the chamber adjacent to the outlet. A second, open end of the cup is positioned distally to the outlet. A nozzle extends from the outlet into the cup through an opening in the first end. The cup is slidably movable along the nozzle. A tether having a first end attached to the cup extends through the nozzle. A second end of the tether is attached to the closing member. Flow of fluid through the nozzle creates a partial vacuum within the cup when the open end engages a fluid surface. The vacuum draw the cup along the nozzle away from the chamber, and the tether draws the closing member into the closed configuration in sealing engagement with the seat, thereby halting the flow of fluid through the chamber.

In another hydrostatic embodiment of the valve, the actuating member comprises a float positioned outside of the chamber. A link member attaches the float to the closing member. The float, when buoyantly supported by the electrolyte or other fluid, applies a force, by virtue of its buoyancy, to the closing member through the link member. The force moves the closing member into the closed configuration.

The invention also includes a battery incorporating a valve as described above.

BRIEF DESCRIPTION OF THE DRAWINGS

FIG. 4 is a cross-sectional view taken at line 4-4 of FIG. 2; and

DETAILED DESCRIPTION OF PREFERRED EMBODIMENTS

Figure 1:
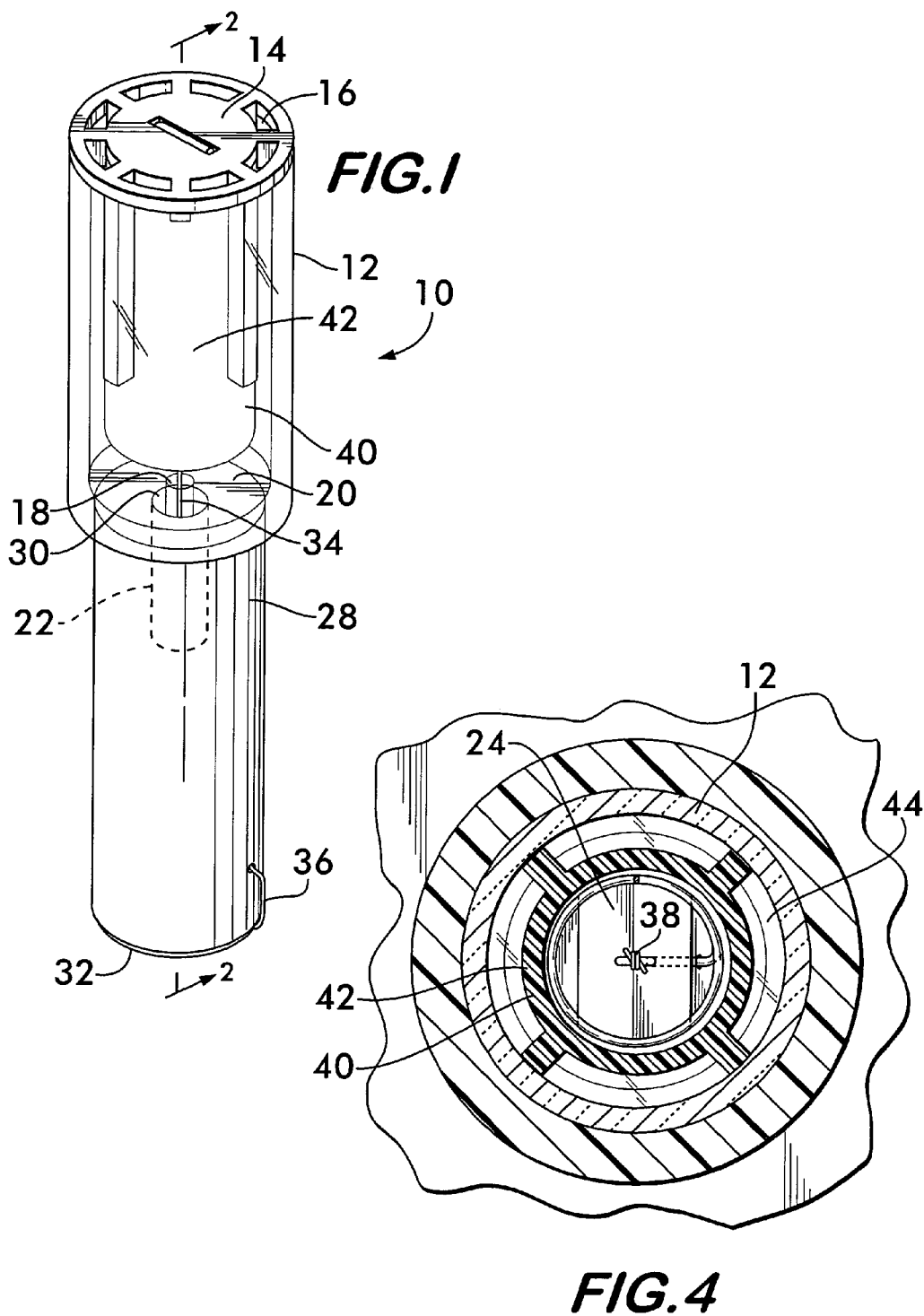
FIG. 1 is a perspective view of an embodiment of a valve according to the invention.
Figure 2:
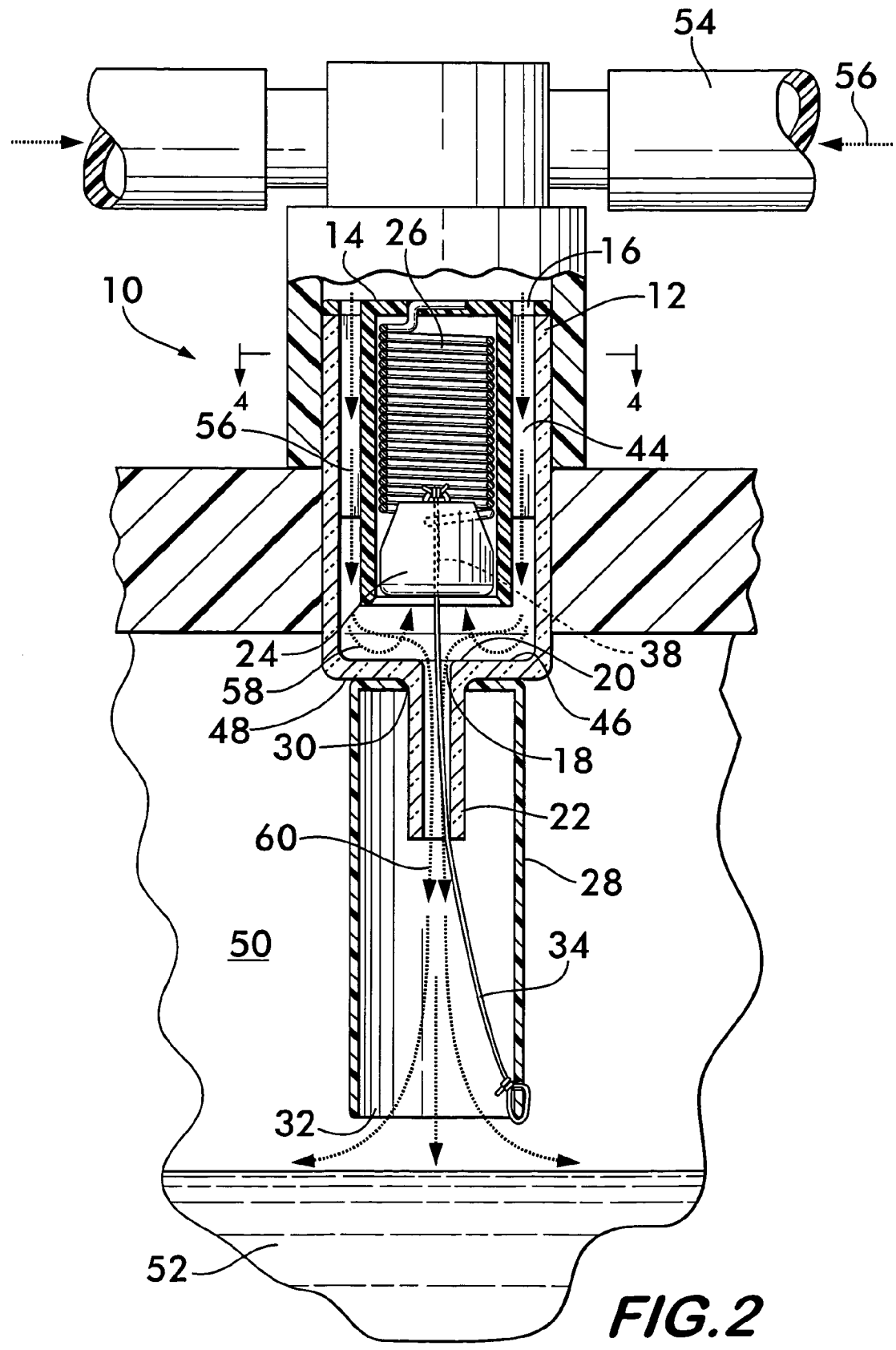
FIGS. 2 and 3 are longitudinal sectional views taken at line 2-2 of FIG. 1 depicting a portion of a battery cell using the valve shown in FIG. 1.

FIG. 1 shows an embodiment of a hydrodynamic valve 10 according to the invention. Valve 10 comprises a chamber 12, preferably in the form of an elongated cylinder. A cap 14 is positioned at one end of chamber 12, the cap having one or more fluid inlets in the form of slots 16 allowing fluid flow into the chamber. A fluid outlet 18 is positioned at the opposite end of chamber 12. A valve seat 20 surrounds the outlet, and as shown in FIG. 2, a nozzle 22 extends from the outlet. A valve closing member in the form of a piston 24 is positioned within the chamber 12. Piston 24 is slidably movable within chamber 12 between an open position (shown in FIG. 2) where it is in spaced relation away from seat 20, and a closed position (see FIG. 3) where it is engaged in sealing relation with the seat. A biasing member, preferably a spring 26, is attached between the cap 14 and the piston. Spring 26 biases the piston into the open configuration. An actuator, preferably in the form of an elongated cylindrical cup 28, is located at the outlet end of the chamber 12. Cup 28 is coaxially aligned with chamber 12 and has an opening 30 in one end through which nozzle 22 passes. The opposite end 32 of cup 28 is open. A tether 34 has one end 36 attached to the cup 28, preferably near the open end 32. The other end 38 is attached to the piston 24. As described in detail below, the cup is slidably movable along the nozzle 22 and acts as an actuator to pull the piston from the open to the closed position against the biasing action of spring 26 through the tether 34.

As shown in FIG. 1, a deflector surface 40 is positioned within the chamber 12 between the inlet slots 16 and the outlet 18. Deflector surface 40 may have any practical shape suitable for a particular valve design, and in this embodiment, the deflector surface preferably comprises an elongated cylinder 42 positioned within chamber 12 and extending from cap 14. Inner cylinder 42 surrounds the piston 24 and preferably is coaxially aligned with the outer cylinder forming the chamber 12. As shown in FIGS. 2 and 4, this configuration produces an annular duct 44 providing fluid communication between the inlet slots 16 and the outlet 18. The deflector surface 40 functions to deflect the flow of fluid around the piston 24 and thereby prevent hydrodynamic drag on the piston by high pressure/high flow rate fluid flows through chamber 12. Thus, there is less tendency for the piston to close prematurely in response to the fluid pressure or flow.

As shown in FIG. 2, a second deflector surface 46 is positioned downstream of the piston 24. In this embodiment, the second deflector surface is formed by the end 48 of chamber 12 that surrounds seat 20. The surface may be flat as shown or may be curved or otherwise shaped so as to provide hydrodynamic enhancements to the fluid flow. The second deflector surface 46 directs a portion of the fluid flow through the chamber against the piston 24 to provide dynamic fluid biasing of the piston as described below.

Figure 3:
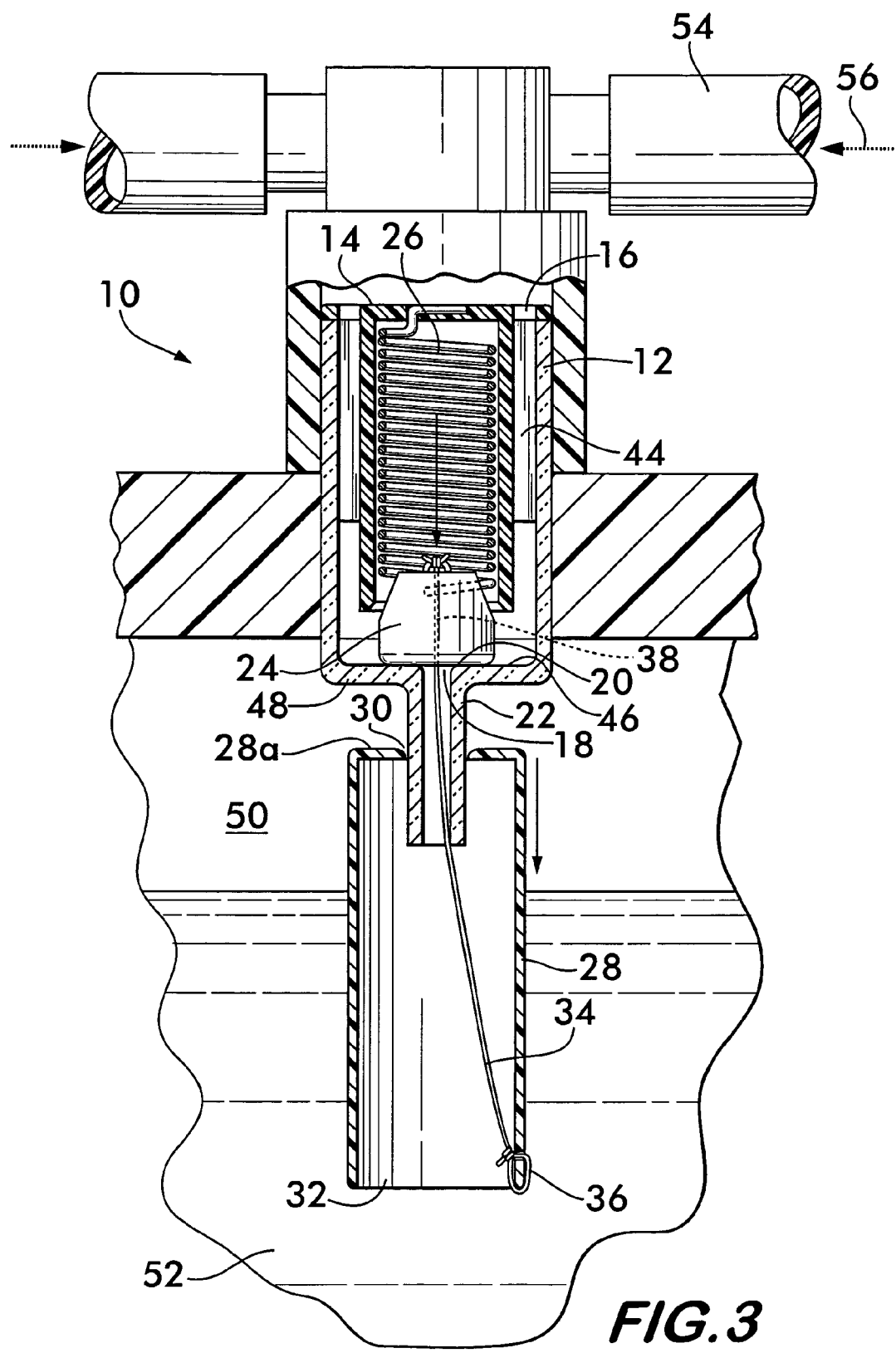

Operation of the valve 10 is described with reference to FIGS. 2 and 3. In FIG. 2, valve 10 is shown positioned within a battery cell 50 having an aqueous electrolyte 52. A fitting 54 connected to a water source (not shown) is attachable to the valve 10 and supplies water 56 to the cell through valve. Water 56 flows into the valve through inlet slots 16 and through the annular duct 44, the water being deflected around the piston 24 by the surrounding deflector surface 40 (cylinder 42). The water 56 impinges on the second deflector surface 46 at the end 48 of chamber 12 and a portion of the flow 58 is deflected toward the piston 24. The remainder of the flow 60 exits through nozzle 22 into cup 28 where it enters battery cell 50 to replenish water lost to electrolysis during battery charging.

The water flow slows as it exits the annular duct 44 due to the sudden increase in cross sectional area of the chamber 12. By Bernoulli's principle, this causes a region of higher pressure to form beneath the piston. The higher pressure acts to augment the biasing force of spring 26. The greater the rate of flow, the higher the pressure in this region. Furthermore, the portion of the flow 58 that is deflected by the second deflector surface 46 experiences a change in momentum that directs the flow portion 58 against the piston, further biasing it in the open position. This dynamic biasing force also increases with increasing pressure and flow rate. The effect of the pressure and flow impingement on the piston is equivalent to having a higher biasing force on the piston at high pressures and flow rates when the pressure and momentum changes will be highest, but a lower biasing force on the piston, due mainly only to the spring 26, during low pressure and low flow rates. This renders the valve very sensitive at low pressure and flow rates and, in conjunction with the effect of the deflector surface 40, provides great stability preventing premature closure of the valve at high pressures and flow rates. Laboratory test results show that the ratio of high to low pressure that the valve can accommodate increases from about 6 to 1 to about 20 to 1, better than a three fold increase in the pressure range.

The portion 60 of the water flow that exits through nozzle 22 works in conjunction with the actuator cup 28 to close the valve. Water 60 fills the cell 50 and the level of the electrolyte 52 rises until it contacts and seals the open end 32 of the cup. Continued flow of water through nozzle 22 draws a vacuum within the cup 28. This allows gas pressure on the outside surface 28a of the closed end of cup 28 to force the cup downwardly into the electrolyte as shown in FIG. 3. Motion of the cup 28 pulls the tether 34, drawing the piston 24 into engagement with the seat 20 thereby halting the flow of water through the valve 10.

Figure 5:
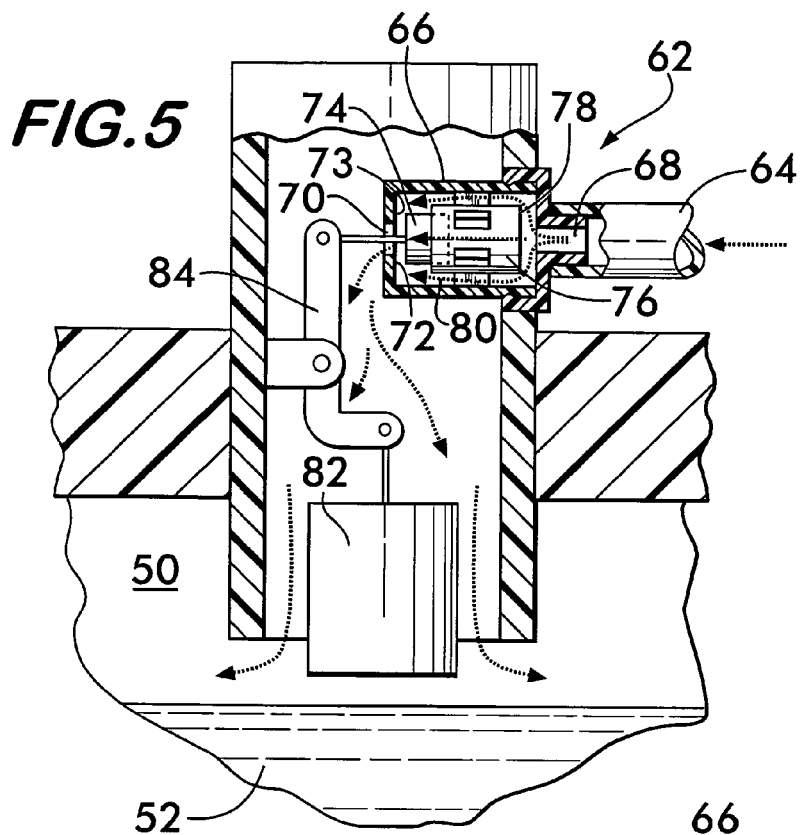
FIGS. 5 and 6 are longitudinal sectional views of a portion of a battery cell using another embodiment of a valve according to the invention.
Figure 6:
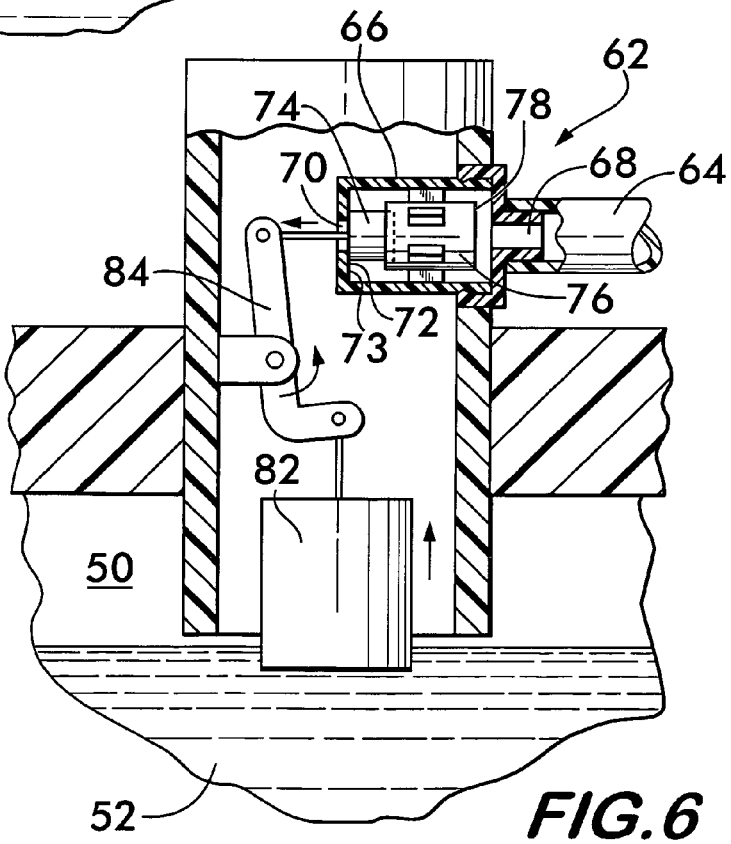

FIGS. 5 and 6 show an example of a hydrostatic valve embodiment 62 according to the invention. Valve 62 is mounted in fluid communication with a battery cell 50 and a conduit 64 connectable to a water source (not shown). Valve 62 comprises a chamber 66 having an inlet 68 connected to the conduit 64 and an outlet 70 in fluid communication with cell 50. A seat 72 surrounds the outlet 70. A valve closing member, preferably a piston 74 is movably mounted within the chamber. The piston may move between an open position in spaced relation away from seat 72 (FIG. 5), and a closed position wherein the piston is engaged in sealing relation with the seat (FIG. 6). Preferably, the piston 74 slides within a cylinder 76 positioned between the inlet 68 and the outlet 70. The end 78 of cylinder 76 that faces the inlet is closed, thus forming a deflector surface that deflects the water flow 80 around the piston and prevents the generation of hydrodynamic drag on the piston that would otherwise tend to force it into the closed position regardless of the fluid level within the cell 50.

A second deflector surface 73 is positioned within chamber 66. Deflector surface 73 faces piston 74 and, as described previously, deflects a portion of the water flow 80 against the piston to augment the biasing of the piston in the open position shown. Again, deflector surface 73 may be shaped to enhance the fluid flow against the piston.

An actuator in the form of a float 82 is buoyantly supportable by the electrolyte 52 within cell 50. Float 82 is connected to piston 74 through a pivoting link member 84. Weight of the float 82 acting through the link member 84 applies a force to piston 74 pushing it away from engagement with seat 72, opening the valve 62 and allowing water 80 to flow into the cell 50. Because of the presence of the deflecting surface 78 the float does not have to push the piston 74 against the flow of water through the chamber 68, enabling the float to be lighter and thus more responsive that if it had to open the valve against the water flow.

As shown in FIG. 6, when the electrolyte 52 reaches the desired level the float 82 is buoyantly supported and exerts a force on piston 74 through link member 84 that closes the valve by engaging the piston 74 with the seat 72, thereby halting the flow of water to the cell.

Positive stop valves according to the invention, whether hydrodynamic or hydrostatic in design, can be operated over greater pressure ranges more reliably due to the presence of the deflector surface that deflects the flow of fluid around the valve closing member, thereby virtually eliminating hydrodynamic drag on the piston that would otherwise tend to close the valve regardless of the desired fluid level. In hydrodynamic valves, the addition of a second deflector surface downstream of the valve closing member provides further dynamic biasing augmenting the forces that keep the valve in the open position. These forces are greatest when they are most needed, i.e., under high pressure and high flow rates that would otherwise engender premature valve closing.

What is claimed is:

1. A valve for controlling fluid flow, said valve comprising:
   a chamber having a fluid inlet and a fluid outlet;
   a valve seat surrounding said outlet;
   a valve closing member positioned within said chamber, said closing member being movable between a closed configuration in sealing engagement with said seat thereby stopping flow of said fluid through said outlet, and an open position in spaced relation away from said seat;
   a biasing member engaged with said closing member, said biasing member biasing said closing member into said open configuration;
   an actuator engaged with said closing member, said actuator adapted to apply a force moving said closing member into said closed configuration, said actuator comprising:
      a cup having a first end positioned outside of said chamber adjacent to said outlet and a second, open end, positioned distally to said outlet, a nozzle extending from said outlet into said cup through an opening in said first end, said cup being slidably movable along said nozzle; and
      a tether having a first end attached to said cup, said tether extending through said nozzle and having a second end attached to said closing member, flow of fluid through said nozzle creating a partial vacuum within said cup when said open end engages a fluid surface, said vacuum drawing said cup along said nozzle away from said chamber, said tether drawing said closing member into said closed configuration in sealing engagement with said seat, thereby halting the flow of fluid through said chamber; and
   a first deflector surface positioned within said chamber between said inlet and said closing member, said first deflector surface deflecting the flow of said fluid around said closing member to prevent flow of said fluid from engaging and moving said closing member into said closed configuration.

2. A valve according to claim 1, further comprising a second deflector surface positioned within said chamber downstream of said valve closing member, said second deflector surface deflecting the flow of said fluid against said closing member so as to further bias said closing member into said open configuration.

3. A valve according to claim 2, wherein said second deflector surface is positioned surrounding said seat in facing relation with said closing member.

4. A valve according to claim 1, wherein said cup comprises an elongated cylinder.

5. A valve according to claim 1, wherein:
   said chamber comprises an elongated outer cylinder, said inlet and outlet being positioned at opposite ends thereof;
   said first deflector surface comprises an inner cylinder positioned within said outer cylinder, said inner and outer cylinders being substantially lengthwise aligned and cooperating to form therebetween a duct, said duct being in fluid communication with said inlet and said outlet;
   said closing member comprises a piston positioned within said inner cylinder, said fluid flowing through said duct around said piston; and
   said biasing member comprises a spring positioned within said inner cylinder, said spring being attached between said inner cylinder and said piston and biasing said piston into said open configuration.

6. A valve according to claim 5, wherein said inner cylinder is coaxially aligned within said outer cylinder, said duct therebetween having an annular cross section.

7. A valve for controlling fluid flow, said valve comprising:
   an elongated outer cylinder having an inlet at one end and an outlet at an opposite end;
   a nozzle in fluid communication with said outlet and projecting from said opposite end;
   an inner cylinder positioned within said outer cylinder, said inner cylinder being substantially lengthwise aligned with said outer cylinder, said cylinders cooperating to define a duct therebetween, said duct being in fluid communication with said inlet and said outlet;
   a valve seat positioned within said outer cylinder downstream of said inner cylinder;
   a piston positioned within said inner cylinder, said piston being reciprocably movable between a closed configuration wherein said piston sealingly engages said seat thereby preventing flow of said fluid through said outlet, and an open configuration wherein said piston is in spaced relation away from said seat;
   a biasing member positioned within said inner cylinder for biasing said piston into said open configuration;
   a cup having a first end positioned outside of said outer cylinder adjacent to said outlet and a second, open end, positioned distally to said outlet, said nozzle extending into said cup through an opening in said first end, said cup being slidably movable along said nozzle; and
   a tether having a first end attached to said cup, said tether extending through said nozzle and having a second end attached to said piston, flow of fluid entering said duct through said inlet and exiting said duct through said nozzle creating a partial vacuum within said cup when said open end engages a fluid surface, said vacuum drawing said cup along said nozzle away from said outer cylinder, said tether drawing said piston into said closed configuration in sealing engagement with said seat, thereby halting the flow of fluid through said valve.

8. A valve according to claim 7, wherein said inner and outer cylinders are co-axially arranged so that said duct has an annular cross section.

9. A valve according to claim 7, further comprising a fluid deflecting surface positioned in spaced apart relation to said inner cylinder and in facing relation with said piston, said deflecting surface deflecting fluid flow through said duct against said piston thereby further biasing said piston into said open configuration.

10. A valve according to claim 9, wherein said deflecting surface is substantially flat and oriented substantially perpendicular to said duct.

11. A valve according to claim 7, wherein said biasing member comprises a spring.

12. A valve according to claim 7, wherein said cup comprises an elongated cylinder.

13. A battery having an aqueous electrolyte, a cell of said battery having a valve positioned in a vent port for controlling flow of water to said cell for replenishment of said electrolyte, said valve being connectable to a source of water and comprising:

an elongated outer cylinder having an inlet at one end and an outlet at an opposite end;

a nozzle in fluid communication with said outlet and projecting from said opposite end;

an inner cylinder positioned within said oar cylinder, said inner cylinder being substantially lengthwise aligned with said outer cylinder, said cylinders cooperating to define a duct therebetween, said duct being in fluid communication with said inlet and said outlet;

a valve seat positioned within said outer cylinder downstream of said inner cylinder;

a piston positioned within said inner cylinder, said piston being reciprocably movable between a dosed configuration wherein said piston sealingly engages said seat thereby preventing flow of said water through said outlet, and an open configuration wherein said piston is in spaced relation away from said seat;

a biasing member positioned within said inner cylinder for biasing said piston into said open configuration;

a cup having a first end positioned outside of said oar cylinder adjacent to said outlet and a second, open end, positioned distally to said outlet, said nozzle extending into said cup through an opening in said first end, said cup being slidably movable along said nozzle to engage said electrolyte within said cell; and a tether having a first end attached to said cup, said tether extending through said nozzle and having a second end attached to said piston, flow of water entering said duct through said inlet and exiting said duct through said nozzle creating a partial vacuum within said cup when said open end engages said electrolyte within said cell, said vacuum drawing said cup along said nozzle away from said chamber, said tether drawing said piston into said closed configuration in sealing engagement with said seat, thereby halting the flow of water through said valve into said cell.

14. A valve according to claim 13, wherein said inner and outer cylinders are co-axially arranged so that said duct has an annular cross section.

15. A valve according to claim 13, further comprising a fluid deflecting surface positioned in spaced apart relation to said inner cylinder and in facing relation with said piston, said deflecting surface deflecting fluid flow through said duct against said piston thereby further biasing said piston into said open configuration.

16. A valve according to claim 15, wherein said deflecting surface is substantially flat and oriented substantially perpendicular to said duct.

17. A valve according to claim 13, wherein said cup comprises an elongated cylinder.

\* \* \* \* \*